United States Patent [19]

Marsh

[11] Patent Number: 4,735,094
[45] Date of Patent: Apr. 5, 1988

[54] DUAL BLUFF BODY VORTEX FLOWMETER

[75] Inventor: David Marsh, N. Scituate, R.I.

[73] Assignee: Universal Vortex, Inc., Hazel Park, Mich.

[21] Appl. No.: 7,926

[22] Filed: Jan. 28, 1987

[51] Int. Cl.[4] ............................................. G01F 1/32
[52] U.S. Cl. .................................................. 73/861.24
[58] Field of Search ............ 73/861.22, 861.23, 861.24

[56] References Cited

U.S. PATENT DOCUMENTS

| | | | |
|---|---|---|---|
| 2,813,424 | 11/1957 | Liepmann et al. | 73/861.24 |
| 3,564,915 | 2/1971 | Tomota et al. | 73/861.24 |
| 3,572,117 | 3/1971 | Rodely . | |
| 3,587,312 | 6/1971 | McMurtrie et al. | 73/204 |
| 3,638,037 | 1/1972 | McMurtrie | 307/233 |
| 3,722,275 | 3/1973 | Rodely et al. . | |
| 3,732,731 | 5/1973 | Fussell, Jr. . | |
| 3,796,095 | 3/1974 | Fussell, Jr. . | |
| 3,823,610 | 7/1974 | Fussell, Jr. . | |
| 3,903,742 | 9/1975 | Colton | 73/861.23 |
| 3,948,098 | 4/1976 | Richardson et al. . | |
| 3,956,928 | 5/1976 | Barrera | 73/861.23 |
| 3,972,232 | 8/1976 | Miller et al. . | |
| 4,047,432 | 9/1977 | Fussell, Jr. . | |
| 4,069,708 | 1/1978 | Fussell, Jr. . | |
| 4,085,614 | 4/1978 | Curran et al. . | |
| 4,088,020 | 5/1978 | Sgourakes et al. . | |
| 4,161,878 | 9/1976 | Fussell, Jr. . | |
| 4,258,565 | 3/1981 | Sawayama et al. | 73/DIG. 4 |
| 4,380,935 | 4/1983 | Sgourakes et al. . | |
| 4,457,181 | 7/1984 | Marsh . | |
| 4,520,678 | 6/1985 | Koziol et al. . | |
| 4,523,477 | 6/1985 | Miller . | |
| 4,627,294 | 9/1986 | Lew | 73/861.24 |
| 4,627,295 | 9/1986 | Matsubara | 73/861.24 |

FOREIGN PATENT DOCUMENTS 2632553 1/1978 Fed. Rep. of Germany .

OTHER PUBLICATIONS

P. W. Bearman, "On Vortex Street Wakes", 28 J. Fluid Mec. (Part 4) 625–641 (1967).
G. Eiffel, *The Resistance of the Air and Aviation,* (Houghton Mifflin Co., 1913), pp. 2–21, 54–62, 120.
A. Roshko, "On the Drag and Shedding Frequency of Two-Dimensional Bluff Bodies", National Advance Committee for Aeronautics Tech. Note 3169 (Jul., 1954).

*Primary Examiner*—Herbert Goldstein
*Attorney, Agent, or Firm*—Gifford, Groh, VanOphem, Sheridan, Sprinkle and Dolgorukov

[57] ABSTRACT

A dual bluff body vortex flowmeter includes a flow passage having first and second ends and a vortex-responsive sensor disposed in the passageway between its ends. A parallel pair of circularly cylindrical bluff bodies are disposed one each between the sensor and the two ends of the passage. The downstream portion of each bluff body faces towards the sensor, so that the sensor is responsive to vortices shed from either the first or second bluff body, when fluid flows in the passage from the first to second end, or from the second to the first, respectively. The sensor is preferably a piezoelectric device mounted in a cantilever beam disposed between the first and second bluff bodies and connected to the interior wall of the flow passage. The use of circularly cylindrical bluff bodies allows flows to be measured which have rates significantly lower than those measurable with conventional bluff body flowmeters, since the circularly cylindrical bluff bodies can be manufactured with smaller but more uniform dimensions than conventional bluff bodies.

15 Claims, 1 Drawing Sheet

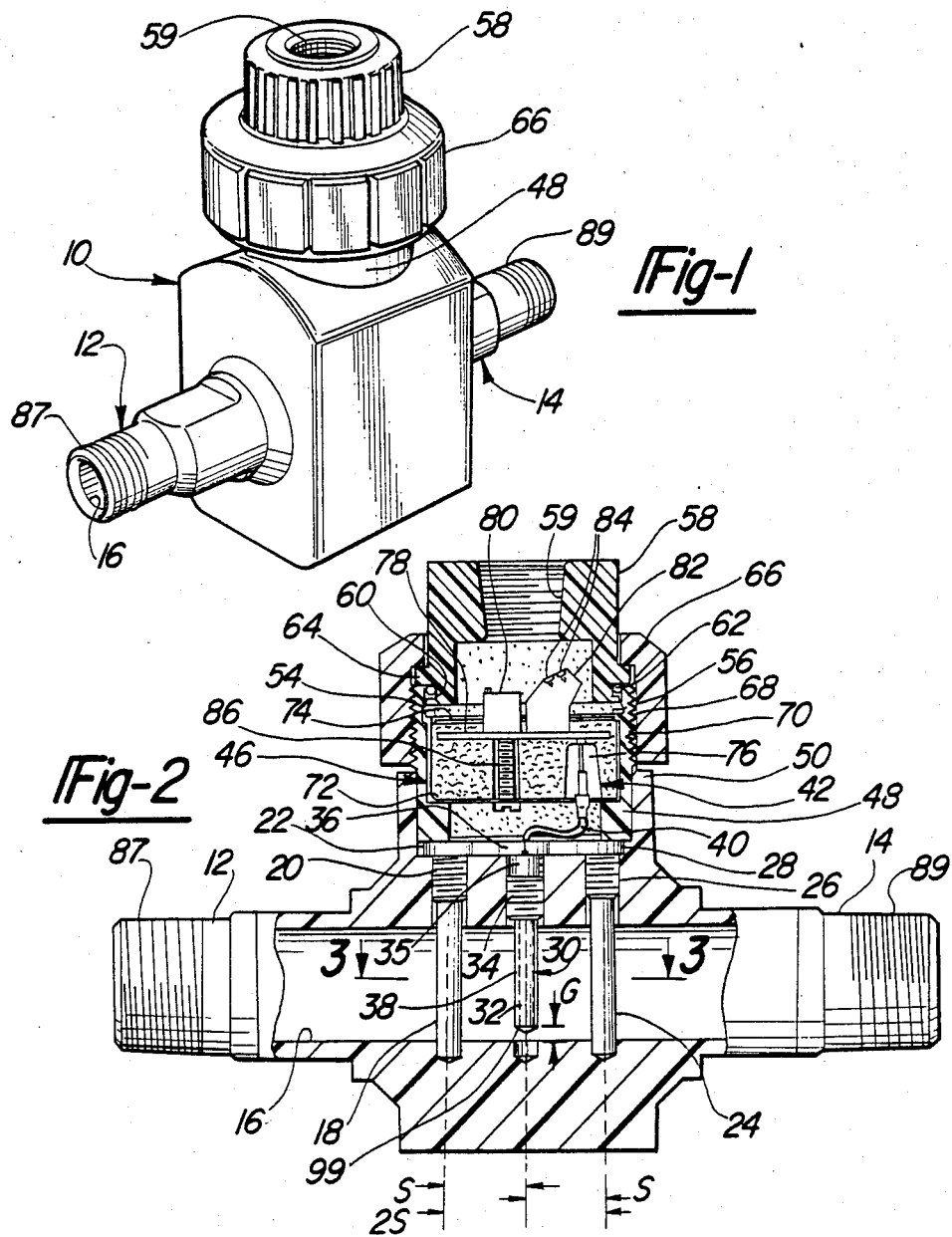
*Fig-1*
*Fig-2*
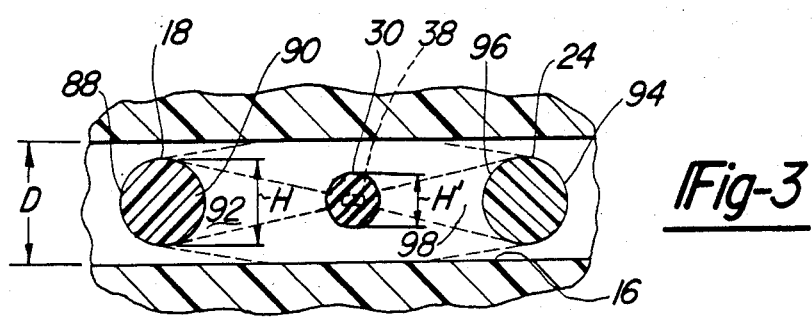
*Fig-3*

DUAL BLUFF BODY VORTEX FLOWMETER

BACKGROUND OF THE INVENTION

I. Field of the Invention

The present invention relates to fluid flowmeters, and more particularly to vortex flowmeters of the type including a bluff body disposed in a flow conduit.

II. Description of the Prior Art

Vortex flowmeters are now well known. They are based on the observation that an obstruction placed in a linear flow of fluid produces a plurality of vortices, shed downstream from the obstruction. The vortices create localized oscillatory variations in observable flow parameters such as pressure or velocity. The vortex flowmeter, in its simplest form, thus comprises a flow conduit, an obstruction disposed in the conduit, and a parameter sensor positioned within the conduit at a location where it can be influenced (directly or indirectly) by the vortices. It is well known that, in order to obtain a useful pattern of vortices, a linear run of conduit must be provided both upstream and downstream of the obstruction and sensor, free of any valving, turns or the like. Typically, this linear run extends a few tens of conduit diameters upstream of the sensor and obstruction, and a few conduit diameters downstream of the sensor. The conduit diameter is, of course, uniform over the linear run.

A variety of such vortex flowmeters are known. Variations between the types of meters involve the shape of structure of the obstruction, commonly called a "bluff body", and the location or structure of the sensor. A bluff body is referred to in the art as "cylindrical" when it is elongated and possesses a substantially uniform cross section taken in a direction transverse to the elongation. It is thus understood in the art that the word does not specifically denote a circular cylinder; rather, it is prefaced with a word denoting the shape of the cross section, for example, a "square" cylinder.

Commonly, the bluff body includes a portion which can be referred to, for the sake of simplicity, as an upstream face. The upstream face is adapted to shed vortices at its most widely separated transverse edges when a fluid flow impinges upon the upstream face from an impingement direction perpendicular to the face. The bluff body also commonly includes a downstream portion which is disposed opposite the upstream face, and which faces the stream of vortices formed or shed by the impingement of fluid upon the upstream face. The downstream portion thus generally faces the parameter sensor. The sensor can be any one of several well-known piezoelectric devices.

While prior vortex flowmeters have functioned adequately for their intended purpose, their use has entailed some drawbacks. The prior vortex meters are structurally complex yet relatively fragile devices. The known vortex meters have thus been high in cost, while subject to damage from vibration during use. They have generally been constructed from materials not particularly resistive to hostile fluid, for example, acids, corrosives, or solvents.

Moreover, in practice many prior bluff body meters have been wafer-type devices, generally configured as relatively flat disks sandwiched between segments of the fluid conduit. The diameter of such a disk is typically slightly larger than the diameter of the conduit. In view of the limitations imposed by this structural arrangement, such meters have been useful only in conduits having a diameter of at least (and typically greater than) several inches.

Further, the prior vortex meters have been subject to the same likelihood for improper installation as other types of unidirectional flowmeters. It is estimated that about ten per cent of all flowmeters installed by inexperienced installers are initially incorrectly installed backwards in the associated conduit. This error is most often discovered only when the fluid circuit is actuated and the meter is observed to be inoperable. The result is an increase in the expense of flow measurement, due to damage to the meter and the time wasted in discovery and rectifying the improper installation.

SUMMARY OF THE PRESENT INVENTION

The present invention overcomes these and other drawbacks by providing a bi-directional bluff body flowmeter which cannot be mounted in an incorrect orientation. The meter of the present invention first comprises a housing defining a flow passage having first and second ends. Each of the first and second passage ends are adapted for connection in series with a fluid conduit so as to cause fluid to flow through the passage in either direction, that is, from the first to the second passage end, or from the second to the first passage end. Thus, either one of the passage ends can serve as an inlet for the passage, while the other serves as a passage outlet.

A vortex-responsive sensor is contained in the passage between the first and second passage ends. A first bluff body is disposed between the first passage end and the sensor, while a second bluff body is disposed between the second passage end and the sensor. Each bluff body is of the type having an upstream portion or face and a downstream portion or face, determined with respect to the adjacent passage end. Thus, the portions of each bluff body which would be conventionally be described as downstream face towards the sensor and each other. Each bluff body is spaced from the sensor a sufficient distance so as to render the sensor responsive to vortices produced by a flow from the adjacent passage end and to the far passage end. Preferably, the sensor comprises a piezoelectric sensor mounted in a cantilever beam disposed directly in the vortex path shed by the bluff bodies.

Advantageously, the housing comprises a housing base defining the passage and passage ends, the bluff bodies and sensor being disposed in the passage, threadably mounted to the housing base; a housing tube, affixed atop the base, which receives circuitry for connecting the sensor to an external control, such as a flow rate display or alarm; a conduit adapter partly slidably received in the housing tube, allowing connection of the circuitry and external control through a standard NPT electrical connection; and a nut engageable with the housing tube for affixing the adapter to the housing tube. The circuitry is preferably disposed in an aluminum radio frequency shield contained in the housing tube. The housing parts are preferably composed of PVC plastic, although other materials such as Kynar are also useful for this purpose. In order to resist damage from vibration, the circuitry is potted in the shield with an insulating material, such as an epoxy, while the sensor is similarly potted in the beam. The interior of the housing tube is also preferably similarly potted. The bluff bodies and sensor beam are each preferably configured as circular cylinders.

The vortex flowmeter of the present invention achieves several advantages over the prior bluff body meters. The meter of the present invention is useful in more hostile environments, since the PVC, Kynar or other plastic from which it is preferably constructed is resistant to corrosion, acid, and most solvents. The meter is also less costly to construct, since the circular cylindrical shape of the bluff bodies and sensor beam are easier to machine and form than other shapes, particularly when of smaller diameter. The uniformity and strength attainable with circular cylinders allows the construction of substantially smaller bluff body and passage diameters than conventionally possible; this permits acceptable signal-to-noise ratios to be obtained for flow rates substantially lower than those measurable with other vortex meters, smaller passage diameters can be employed, for example, ranging from one inch down to one-quarter inch. This result is obtained at a cost of only about one-third that of other meters.

Most importantly, however, the present invention affirmatively avoids any risk of inoperability on account of installation in an improper orientation. Since the sensor is positioned so as to be responsive to fluid flow from either direction, orientation of the meter at installation is irrelevant; the meter operates satisfactorily regardless which end is connected to the supply of fluid. The avoidance of the costs of replacing damaged meters or of discovering and reinstalling misoriented meters substantially lessens the overall cost of measuring fluid flow.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which:

FIG. 1 is a perspective view of the preferred embodiment of the present invention;

FIG. 2 is a cross-sectional view of the preferred embodiment of the present invention; and FIG. 3 is a cross-sectional view taken along line 3—3 of FIG. 2.

DETAILED DESCRIPTION OF THE PREFERRED EMBODIMENT OF THE PRESENT INVENTION

With reference now to FIGS. 1 and 2, a dual body vortex flowmeter according to the present invention is thereshown and first comprises a housing base 10 having a first open end 12, a second open end 14 located opposite the first end 12, and a portion extending between the ends 12 and 14 defining a flow passage 16. Each of the ends 12 and 14 can serve as a fluid inlet for the passage 16, while the other of the ends 14 and 12 can similarly serve as an outlet or an inlet for the passage 16.

With reference now to FIG. 2, the flowmeter of the present invention also comprises a first bluff body 18 disposed in the passage 16, and connected to the housing by a threaded portion 20. A slotted head 22 is affixed atop the first bluff body 18 so as to allow the bluff body 18 to be mounted in the housing 10 by manual means, such as a screwdriver. The head 22 also acts as a stop, preventing any bending of the bluff body 18 which might otherwise occur, should the bluff body 18 accidently be threaded so tightly as to abut its lower end against the wall of the passage 16, and be compressed thereagainst.

The flowmeter of the present invention further comprises a second bluff body 24 disposed in the passageway 16 at a location spaced from the first bluff body 18. The second bluff body 24 is affixed in the housing 10 by a threaded portion 26, and includes a slotted head 28 serving the same function as the slotted head 22 of the bluff body 18.

A vortex-responsive sensor 30 is disposed in the passage 16 between the first bluff body 18 and the second bluff body 24, preferably midway between the two bluff bodies 18 and 24. The sensor 30 preferably comprises an outer sensor body 32 affixed to the housing 10 by a threaded portion 34. The sensor 30 also includes a slotted head 36, spaced from the threaded portion 34 by a threadless space 35. The sensor 30 also includes a cantilever beam and a piezoelectric sensor device 38 coaxially embedded in and extending substantially the length of the beam (shown in phantom in FIG. 2)

A coaxial cable 40 passes through the head 36 of the sensor 30 and is disposed in series with the piezoelectric sensor device 38 and a connection means 42 for connecting the sensor device 38 with the environment in which the flowmeter is disposed.

The connecting means 42 is at least partly contained in a cup-like aluminum housing 46 received on a cylindrical shelf formed in a round tubular housing spacer 48 received in a tubular recess 50 in the top of the housing base 10. The spacer 48 is preferably affixed to the housing base 10. The upper end of the tubular housing spacer 48 includes a tapered groove 54 in which a snap ring 56 is received. The tension of the snap ring 56 urges it in a downward direction, against and retaining the aluminum housing 46 in the tubular spacer 48. A tubular conduit connector or adaptor 58 is also received in the tubular spacer 48 and includes a circumferential groove 60 having an O-ring 62 disposed therein, as well as a flange 64 located adjacent the groove 60. The O-ring 62 abutably engages the interior of the tubular spacer 48 so as to provide a seal thereagainst, while the flange 64 limits the distance the adaptor 58 can be inserted into the tubular spacer 48. The adaptor 58 includes a threaded portion 59 opposite the spacer 48 defining, for example, an NPT conduit hole. The adaptor 58 is retained in the tubular spacer 48 by a hand nut 66 disposed about the adaptor 58 and the spacer 48, so as to trap the flange 64 therebetween. The nut 66 includes an internal threaded portion 68 engaged with an external threaded portion 70 on the tubular spacer 48. Most advantageously, the O-ring 62 is made of a resilient, synthetic material, while the housing base 10, bluff bodies 18 and 24, sensor body 32, housing spacer 48, adaptor 58 and hand nut 66 are all constructed from an inert but relatively easily machinable material, most preferably, PVC plastic.

The electrical connection means 42 will now be described in more detail. The aluminum housing 46 included in the connector means 42 comprises an aluminum housing cup 72 and an aluminum housing lid 74 disposed atop the cup 72, serving as a radio frequency shield for circuitry contained inside the housing 46. The snap ring 56 thus abuts the upper edge of the cup 72. The coaxial cable 40 passes through the bottom of the housing cup 72 and is connected by a conventional connector 76 to a sensor circuit board 78 contained in the housing 46. The circuit board 78 preferably carries thereon circuitry for linearizing the signal received from the piezoelectric device 38, so as to provide an analog signal useful by existing fluid circuit control means. This is most advantageous when the meter of the present invention is installed in existing fluid circuits. The circuitry carried by the circuit board 78 includes a potentiometer 80 for adjustment of the circuitry to the anticipated Reynolds number of the flow to be measured. The frequency of oscillations experienced by a piezoelectric sensor in a bluff body flowmeter is well known to increase as the viscosity of the fluid increases, and it is convenient to dispose the circuitry for adjusting the response of the meter to these changes in the housing 10. The connecting means 42 also includes a conventional terminal block 82 affixed to the circuit board 78, having thereon a pair of terminal clips 84 connectable to the external controls. The circuit board 78, associated components and housing lid 74 are connected to the housing cup 72 by a bolt 86.

The upper portion of the housing base 10 is preferably filled with a potting material, most preferably an electrically insulating material. The potting material partially fills the interior of the tubular housing spacer 48 connected to the housing base 10 and the interior of the aluminum housing 46. The sensor device 38 is separately potted in the sensor body 32. This potting material affirmatively insulates the electrical circuitry from the fluid normally contained in the passage 16, in case of leakage, and simultaneously protects the connecting means 42 and contained circuitry from the vibrations normally encountered by flowmeters during operation of the fluid flow system in which they are disposed. The meter is, of course, connected to a fluid flow system by threaded portions 87 and 89 formed on the ends 12 and 14, respectively, of the housing base 10.

With reference now to FIGS. 2 and 3, operation of the dual bluff body vortex flowmeter of the present invention can be readily understood. The first bluff body 18 and the second bluff body 24 are each preferably configured as circular cylinders, as is the body portion 32 of the sensor 30. When fluid enters the passage 16 through the first end 12 and exits the passage through the second end 14, a semicylindrical upstream face 88 of the first bluff body 18 faces towards the direction of flow in the passage 16, while a downstream face 90 faces towards the sensor 30. The flow of fluid past the bluff body 18 results in the production of a series of first direction vortices 92 formed in the wake shed from the outermost transverse edge of the bluff body 18. The sensor 30 is spaced a distance S from the first bluff body 18 so as to be disposed in the vortex wake 92.

Alternatively, when the meter is installed in the opposite direction, flow entering the passage 16 through the second end 14 impinges upon a semicylindrical upstream face 94 of the second bluff body 24. A downstream face 96 of the second bluff body 24 opposite the upstream face 94, faces the sensor 30. When fluid flows from the second end 14 and to the first end 12, a series of second direction vortices 98 are formed in a wake shed from the outermost transverse edge of the bluff body 24. The sensor 30 is also located a distance S from the second bluff body 24 so as to be disposed in the second direction vortex wake 98.

Thus, without regard to which end 12 or 14 serves as the fluid inlet and which end 14 or 12 serves as the fluid outlet, the sensor 30 will always be disposed in a vortex wake shed by a bluff body contained in the fluid passage 16. Costly error, wasted time or damage to equipment, all previously caused by the insulation of a flowmeter in the wrong direction, is thus affirmatively avoided.

Performance of the bluff body flowmeter is optimized when certain dimensions are employed. More specifically, if D is the internal diameter of the flow passage 16, H is the effective diameter of the bluff body 18 or 24, H' is the effective diameter of the sensor body 32, G is the distance between the free end 99 of the sensor 30 and the opposite portion of the interior surface of the flow passage 16, and S is the distance between either of the bluff bodies 18 or 24 and the sensor 30, then the performance of the flowmeter is acceptable when the following conditions are met: the ratio H/D is 0.12 to 0.46; the ratio S/D is 0.6 to 1.5; the ratio H'/H is 0.0 to 1.7; and the ratio G/D is 0.0 to 1.0.

The dual bluff body flowmeter of the present invention is advantageous over the prior devices in several ways. The meter costs only about one-third as much to manufacture as other bluff body flowmeters, yet affirmatively avoid the costs associated with installation of a flowmeter in the wrong direction. The use of cylindrical bluff bodies and the cylindrical sensor body permits the flowmeter to be dimensioned smaller than prior bluff body flowmeters, permitting the successful measurement of substantially lower fluid flow rates. For example, the passage diameter D is preferably in the range of 0.25 to 1.00 inches. This permits accurate flows to be obtained with fluids having Reynolds numbers as low as 600, and permits a turn down ratio of 12:1. Thus, for example, D equal 1 inch permits a maximum measured flow rate of about 50 gallons per minute, and a minimum of about 4.2 gallons per minute. When D equals ¼ inch, the maximum flow rate measurable is typically 5 gallons per minute, while the minumum is about 0.4 gallons perminute. Such flow rates can be measured with an accuracy of about plus or minus 1 per cent of the maximum flow rate, and a repeatability of about 0.25 per cent of the maximum flow rate. The rates of flow thus measurable are significantly lower than the lowest rates measurable with other bluff body flowmeters. It is particularly advantageous that the bluff bodies be constructed symmetrically and disposed symmetrically about the sensor 30.

Having described my invention, however, many modifications thereto will become apparent to those skilled in the art to which it pertains, without deviation from the spirit of the present invention, as defined by the scope of the appended claims.

I claim:

1. A fluid flowmeter connectable to a fluid flow conduit, comprising:

a housing including a portion defining a flow passage having first and second ends, and first and second identical means adjacent said first and second ends for fluidly connecting said housing to said conduit;

a vortex responsive sensor disposed in said passageway between said first and second passage ends, comprising a cantilever beam and a piezoelectric device coaxially embedded in and extending substantially the length of said beam;

means threadably mounting said sensor to said housing;

a first bluff body disposed in said flow passage between said first passage end and said sensor, spaced from said sensor a distance sufficient so as to shed vortexes on said sensor in response to a flow from said first passage end;

a second bluff body substantially identical to said first bluff body disposed in said flow passage between said second passage end and said sensor, also spaced from said sensor said distance, so as to shed vortexes on said sensor in response to a flow from said second passage end; and means threadably mounting said first and second bluff bodies to said housing.

2. The invention according to claim 1, wherein said sensor mounting means comprises a threaded aperture through said housing, said aperture having a diameter greater than that of said cantilever beam; and a matchingly threaded portion on said sensor.

3. The invention according to claim 2, wherein said sensor includes a slotted head.

4. The invention according to claim 1, wherein said first and second bluff body mounting means comprises a pair of threaded apertures through said housing dimensioned to allow insertion of said first and second bluff bodies therethrough, and matchingly threaded portions on said first and second bluff bodies.

5. The invention according to claim 4, wherein said first and second bluff bodies each include a slotted head.

6. The invention according to claim 1, wherein said sensor and said first and second bluff bodies are configured as circular cylinders.

7. The invention according to claim 6, wherein said sensor and said first and second bluff bodies are disposed parallel to one another.

8. The invention according to claim 6, wherein said first and second bluff bodies each have a diameter of between about 0.03 and 0.5 inches.

9. The invention according to claim 6, wherein said sensor has a diameter of no more than about 0.85 inches.

10. The invention according to claim 1, wherein said housing includes means for connecting said meter to a fluid flow circuit including fluid flow control means, and circuit means contained in said housing for operationally connecting said sensor to said flow control means and said flowmeter further comprises circuit means in said housing for operatively connecting said flowmeter to said flow control means.

11. The invention according to claim 10, further comprising a radio frequency shield disposed about said circuit means, an interior ramp surface formed in said housing adjacent said shield, and a snap ring disposed in abutment with said ramp surface and said shield so as to retain said shield and said circuit in said housing.

12. The invention according to claim 1, wherein said housing, said cantilever beam and said first and second bluff bodies are constructed of an inert but easily machineable material.

13. The invention according to claim 12, wherein said material is polyvinyl chloride plastic.

14. The invention according to claim 1, wherein said first and second fluidly connecting means comprises identically externally threaded portions on said housing adjacent said first and second passage ends.

15. The invention according to claim 1, wherein said flow passage is about 0.25 to 1.00 inches in diameter.

* * * * *